United States Patent
Liang et al.

(10) Patent No.: US 7,619,880 B2
(45) Date of Patent: Nov. 17, 2009

(54) PORTABLE ELECTRONIC DEVICE WITH DRAINAGE STRUCTURE

(75) Inventors: Pei-Fang Liang, Jhudong Township, Hsinchu County (TW); Ping-Wei Lee, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 0 days.

(21) Appl. No.: 12/078,208

(22) Filed: Mar. 28, 2008

(65) Prior Publication Data

US 2008/0266765 A1    Oct. 30, 2008

(30) Foreign Application Priority Data

Apr. 28, 2007    (CN)    ................. 2007 1 0027756

(51) Int. Cl.
*G06F 1/16*    (2006.01)
(52) U.S. Cl. .................... 361/679.08; 361/679.11; 400/496; 400/691
(58) Field of Classification Search .......... 361/680, 361/683; 200/302.1; 400/496, 691–693
See application file for complete search history.

(56) References Cited

U.S. PATENT DOCUMENTS

| | | | | |
|---|---|---|---|---|
| 4,760,217 A * | 7/1988 | Suzuki et al. | ............... | 200/5 A |
| 4,948,281 A * | 8/1990 | Werner | ................. | 400/472 |
| 5,119,078 A * | 6/1992 | Grant | ............. | 345/172 |
| 5,339,097 A * | 8/1994 | Grant | ............. | 345/168 |
| 5,416,498 A * | 5/1995 | Grant | ............. | 345/168 |
| 5,421,659 A * | 6/1995 | Liang | ............. | 400/472 |
| 6,054,939 A * | 4/2000 | Wei et al. | ............. | 341/20 |
| 6,179,500 B1 * | 1/2001 | Oura et al. | ............. | 400/693 |
| 6,443,644 B1 * | 9/2002 | Takeda et al. | ............. | 400/490 |
| 6,467,683 B2 * | 10/2002 | Jun | ............. | 235/145 R |
| 6,542,355 B1 * | 4/2003 | Huang | ............. | 361/680 |
| 6,705,783 B1 * | 3/2004 | Bowen | ............. | 400/472 |
| 6,860,660 B2 * | 3/2005 | Hochgesang et al. | ........ | 400/472 |
| 7,038,598 B2 * | 5/2006 | Uke | ............. | 341/20 |
| 7,385,808 B2 * | 6/2008 | Hamada et al. | ............. | 361/680 |
| 2005/0224326 A1 * | 10/2005 | Oikawa | ............. | 200/302.1 |
| 2006/0165465 A1 * | 7/2006 | Wu | ............. | 400/491 |

\* cited by examiner

*Primary Examiner*—Jayprakash N Gandhi
*Assistant Examiner*—Anthony Q Edwards
(74) *Attorney, Agent, or Firm*—Quintero Law Office, PC (57) ABSTRACT

A drainage structure is provided for a portable electronic device, such as a portable computer. The drainage structure includes an inclination formed on a top surface of a body of the portable electronic device to support a keyboard device in an inclined manner so that water spilled on the keyboard device or the top surface can be expelled out of the electronic device by gravity. If desired, height adjusting units can be arranged between the keyboard device and the top surface of the body to selectively maintain the keyboard in a horizontal condition. A drain hole or groove can be selectively formed in the body of the electronic device to facilitate drainage of water.

9 Claims, 9 Drawing Sheets

PORTABLE ELECTRONIC DEVICE WITH DRAINAGE STRUCTURE

FIELD OF THE INVENTION

The present invention relates to an electronic device, such as a portable computer, and in particular to an electronic device that is provided with a drainage structure to facilitate drainage of water out of the electronic device by means of gravity of water.

BACKGROUND OF THE INVENTION

Portable computers are commonly used in various applications, of which those subjected to severe environment include military computers and electronic computers, which are often operated in high humidity and high temperature conditions. Thus, those computers require excellent drainage in order to ensure proper operation in the worst and most severe conditions. This is particularly true when the computers are used in for example a raining cl or a wet tunnel.

Some known techniques provide drainage for computers. For example, Chinese Utility Model No. 200320123731.2 discloses a drainage structure for a computer, which provides grooves in side walls of a computer casing in order to drain water that penetrates into the computer casing. Such grooves, however, complicates the structure of the computer casing and thus making the manufacturing thereof difficult and costs increased.

Another example is disclosed in Chinese Utility Model No. 03208029.8, which also provides drainage for computers. Tunnels are formed and extend through a computer casing for draining water that pours onto a keyboard set out of the computer casing. Again, this complicates the structure and the manufacturing of the computer casing.

It is also noted that the computers for military or industrial applications are often subjected to other adverse factors, such as dust or chemicals, which may causes jamming of the drainage passages or grooves, eventually leading to failure of draining water. This makes the known techniques unsuitable for the attempted applications in military and industrial environments.

Thus, the present invention is aimed to overcome the drainage problem of computers and to provide a drainage structure for computers that effectively and efficiently drain any liquid spilled onto the computer to thereby ensure proper operation of the computers.

SUMMARY OF THE INVENTION

An objective of the present invention is to provide a portable electronic device with a drainage structure to facilitate smoothly draining water out of a device body of the electronic device by the gravity of the water.

Another objective of the present invention is to provide a drainage structure for a portable electronic device that has a simple structure that is easy to manufacture with low costs.

A further objective of the present invention is to provide a drainage structure for a portable electronic device that can maintain proper operation without being jammed by dust or other foreign objects.

To realize the above objectives, in accordance with an aspect of the present invention, a portable electronic device drainage structure is provided. The portable electronic device comprises (1) a body that has a top surface, a front wall, a rear wall opposite to the front wall, a left side wall, and a right side wall opposite to the left side wall, wherein the top surface forms an inclination angle with respect to a reference horizontal surface for guiding water; and (2) a keyboard device that comprises a carrier board and a plurality of key units arranged on a top face of the carrier board, wherein the carrier board is mounted to the top surface of the body.

In accordance with an embodiment of the present invention, the top surface of the body is made to incline from the left side wall of the body to the right side wall of the body or alternatively, the top surface of the body is made to incline from the right side wall of the body to the left side wall of the body.

In accordance with another embodiment of the present invention, the top surface of the body is made to incline from the rear wall of the body to the right wall of the body.

In accordance with another embodiment of the present invention, the top surface of the body forms a ridge and comprises at least one inclined surface section that extends from the ridge to one of the top surface, the front wall, the rear wall, the left side wall, and the right side wall in a downward inclined manner. Or alternatively, the top surface of the body comprises a curved surface.

In accordance with an embodiment of the present invention, the carrier board of the keyboard device extends between the left side wall and the right side wall of the body and covers the top surface of the body.

In accordance with an embodiment of the present invention, the top surface of the body forms a keyboard receptacle zone and the keyboard device is received in the keyboard receptacle zone.

In accordance with an embodiment of the present invention, the top surface of the body is provided with at least one height adjusting unit arranged at a predetermined location on the top surface for engaging a corresponding location on a bottom face of the carrier board of the keyboard device so that when the keyboard device is mounted to the top surface of the body, a surface of the keyboard device is maintained substantially on a horizontal reference surface. Or alternatively, the carrier board of the keyboard device has a bottom face, which is provided with at least one height adjusting unit arranged at a predetermined location thereof for engaging a corresponding location on the top surface of the body so that when the keyboard device is mounted to the top surface of the body, a surface of the keyboard device is maintained substantially on a horizontal reference surface.

In accordance with another aspect of the present invention, an electronic device with drainage structure is provided, wherein the portable electronic device comprises (1) a body having a top surface, a front wall, a rear wall opposite to the front wall, a left side wall, and a right side wall opposite to the left side wall; (2) at least one drainage structure, which is formed at a predetermined location on the top surface of the body, and the top surface of the body forming a water-guiding inclination angle with respect to a reference horizontal surface and extending in a direction toward the drainage structure; and (3) a keyboard device comprising a carrier board and a plurality of key units arranged on a top face of the carrier board, wherein the carrier board is mounted to the top surface of the body.

In accordance with an embodiment of the present invention, the drainage structure comprises at least one drainage hole formed in the body.

In accordance with another embodiment of the present invention, the drainage structure comprises at least one drainage groove formed in the body.

In accordance with another embodiment of the present invention, the drainage structure is formed at the predetermined location that is close to one of the right side wall, the left side wall, the front wall, and the rear wall of the body.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
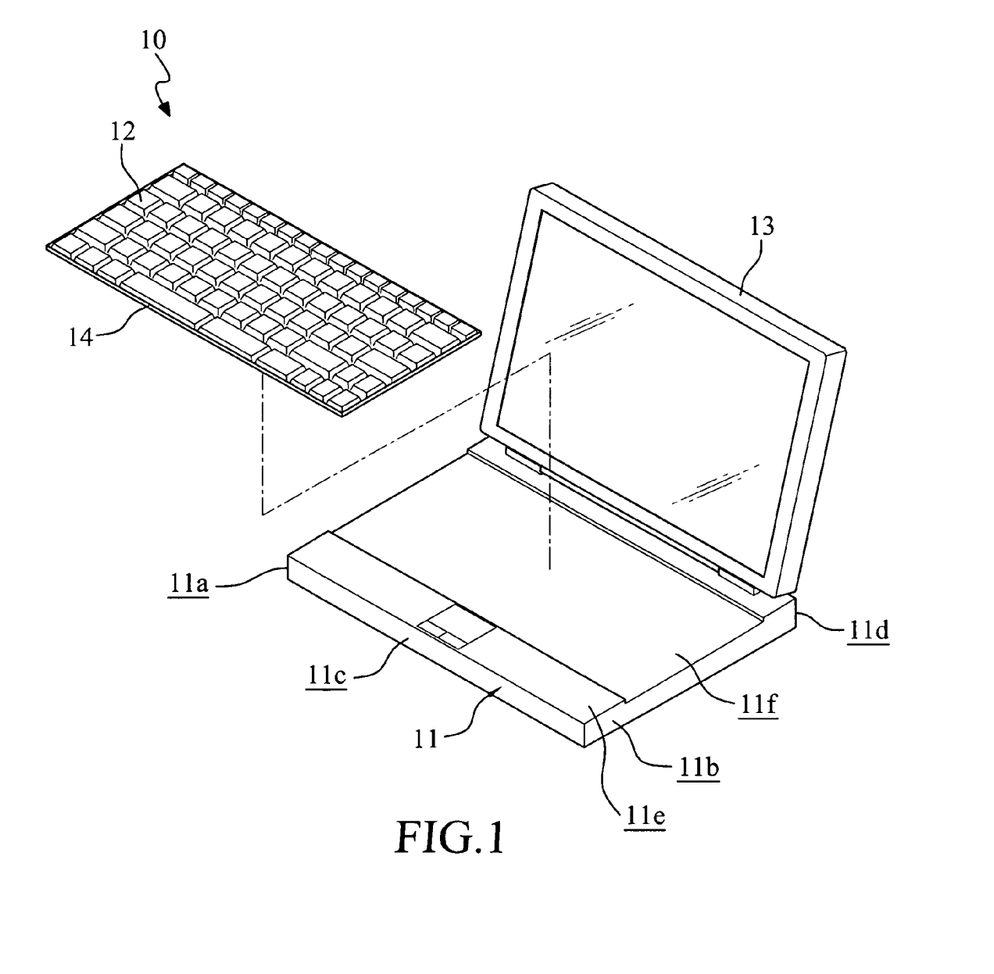
FIG. 1 is a perspective view of a portable electronic device, such as a portable computer, having a device body having a top surface to support a keyboard device, the keyboard device being detached from the device body in the drawing.
Figure 2:
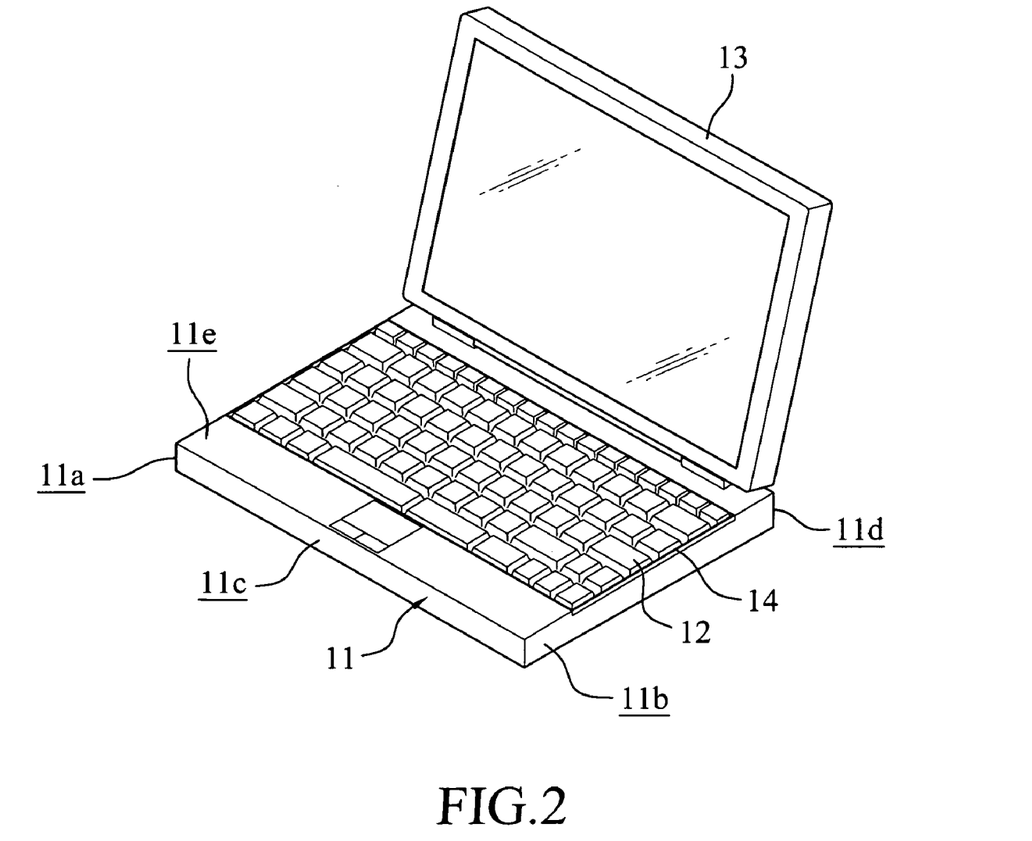
FIG. 2 is a perspective view similar to FIG. 1 but showing the keyboard device mounted to the top surface of the device body.

With reference to the drawings and in particular to FIGS. 1 and 2, a computer, such as a portable computer, in which a drainage structure in accordance with the present invention is embodied, comprises a body 11 to which a cover 13 that preferably carries a display is rotatably mounted. In the embodiment illustrated, the body 11 is of a parallelepiped structure having a top surface 11e and an opposite bottom (not labeled), which connected to each other by a front wall 11c, a rear wall 11d opposite to the front wall 11c, a left side wall 11a, and a right side wall 11b opposite to the left side wall 11a. The top surface 11e forms a recess, serving as a keyboard receptacle zone 11f, in which a keyboard device 10 is received and retained.

The keyboard device 10 comprises a carrier board 14 having a top face on which a plurality of key units 12 is arranged. The key units 12 are actuateable by a user to generate a striking signal to the computer so as to serve as a man-machine interface through which user's commands are entered to the computer.

The keyboard device 10 is received in the keyboard receptacle zone 11f with the carrier board 14 of the keyboard device supported on and mounted to the keyboards receptacle zone 11f to thereby secure the keyboard device 10 to the top surface 11e of the computer body 11.

It is preferable that the keyboard device 10 is mounted to the top surface 11e of the computer body 11 by having the carrier board 14 substantially extending between the left side wall 14a and the right side wall 14b of the computer body 11.

Figure 3:
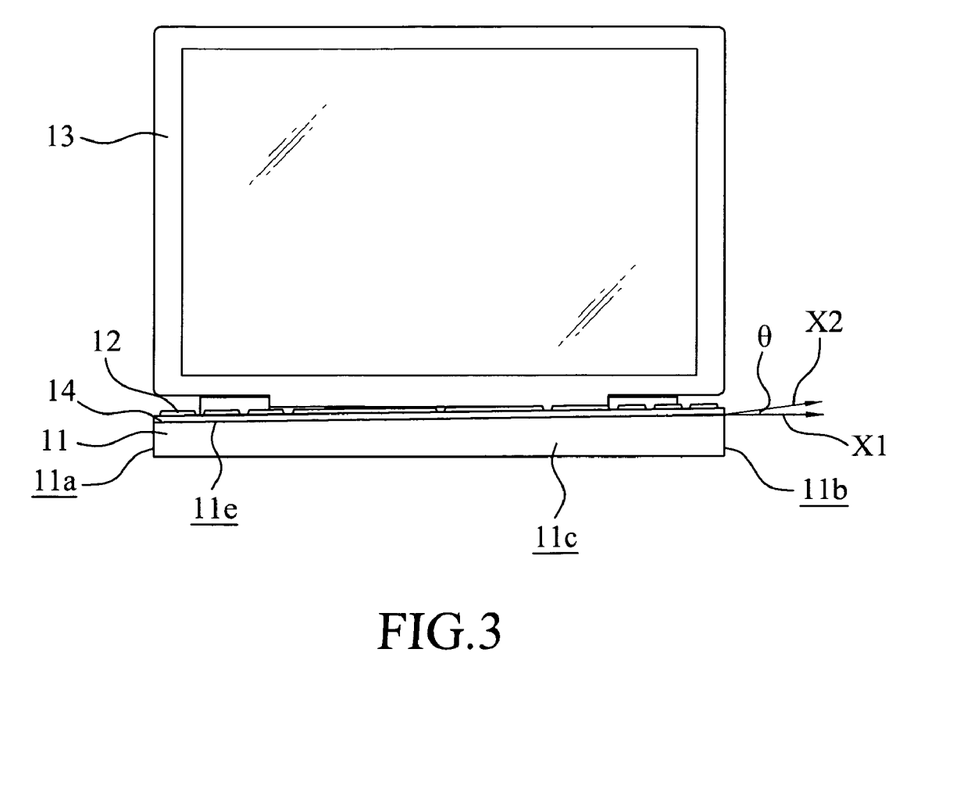
FIG. 3 an elevation of the portable electronic device in accordance with the present invention, illustrating the inclination of the top surface of the device body.

Also referring to FIG. 3, the computer body 11 is provided with a drainage structure, which functions to guide and thus drain water spilled onto the top surface 11e of the computer body 11 away from the computer body 11. In accordance with a preferred embodiment of the present invention, the drainage structure comprises at least one slope or inclined section, as indicated by arrow X2 in FIG. 3, formed on the top surface 11e of the computer body 11 so that an inclination angle θ is formed between the top surface 11e of the computer body 11 and the a reference horizontal surface, which is indicated by arrow X1 in FIG. 3. Thus, as clearly shown in FIG. 3, the two surfaces X1, X2 forms an inclination angle θ therebetween.

With the inclination angle θ of the top surface 11e of the computer body 11, any water spilled on the top surface 11e of the computer body 11 or the keyboard device 10 can be guided by the inclined top surface 11e and caused to move off the computer body 11 by the gravity. Drainage of water out of the computer is thus realized by means of gravity. No complicated structure is needed and jamming of water channels does not exist in the structure of the present invention.

In the embodiment illustrated in FIG. 3, the inclination is made so that the top surface 11e of the computer body 11 is inclined downward from the right side wall 11b to the left side wall 11a. It is apparent that the top surface 11e can be made to incline downward from the left side wall 11a to the right side wall 11b.

Figure 4:
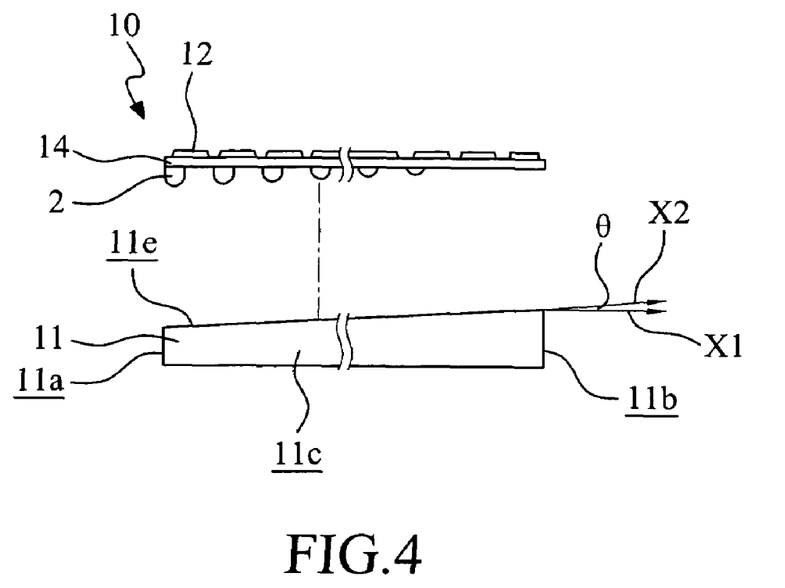
FIG. 4 is an elevation of device body of the portable electronic device with a cover removed, to illustrate the arrangement between the keyboard device and top surface of the device body in accordance with a different embodiment of the present invention.

FIG. 4 shows a modification of the computer body 11. In the modified embodiment shown in FIG. 4, the drainage structure of the present invention comprises height adjusting units 2 that are arranged between the keyboard device 10 and the top surface 11e of the computer body 11 in order to maintain the keyboard device 10 in a substantially horizontal plane even though the top surface 11e on which the keyboard device 10 is positioned is inclined with respect to the reference horizontal surface.

In the embodiment illustrated in FIG. 4, the height adjusting units 2 are mounted to a bottom face (not labeled) of the carrier board 14 of the keyboard device 10 at predetermined locations and extend downward from the carrier body 14 to each form a lower free end engageable with the top surface 11e of the body 11. The height adjusting units 2 are of different selected vertical dimensions so that when the keyboard device 10 is mounted to the top surface 11e of the computer body 11, the lower free ends of the height adjusting units 2 are set in engagement with the top surface 11e to set the keyboard device 10 substantially on a horizontal plane. A simple way of arrangement of the height adjusting units 2 is to increase or decrease the vertical dimensions of the height adjusting units 2 in accordance with the inclination angle or slope θ of the top surface 11e so that when the lower ends of the height adjusting units 2 contact the top surface 11e, the keyboard device 10 is put in a horizontal condition.

This arrangement allows the keyboard device 10 to be maintained horizontally, even though the top surface 11e of the computer body 11 is made inclined, to facilitate operation thereof by a user.

Figure 5:
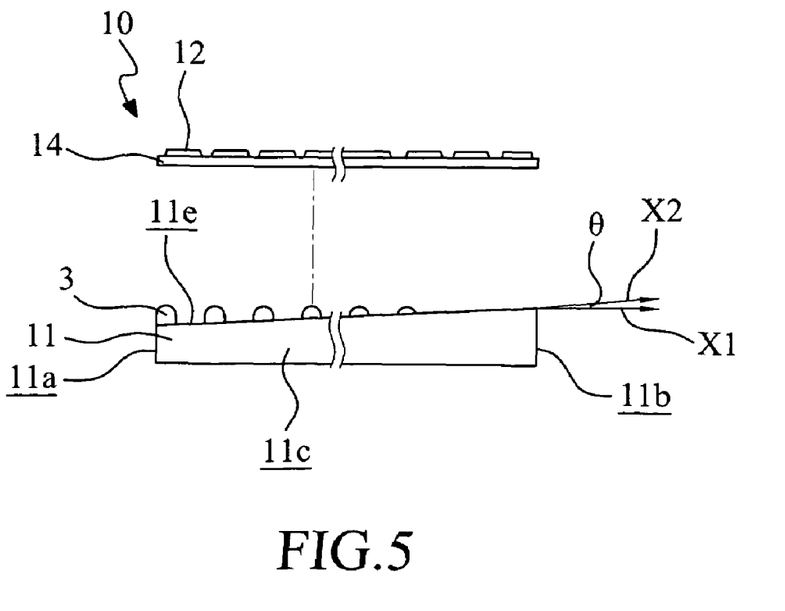
FIG. 5 shows a modified embodiment of that shown in FIG. 4.

As an apparent modification to the embodiment illustrated in FIG. 4, FIG. 5 shows a different embodiment, which comprises at least one height adjusting unit 3 and preferably there are a plurality of height adjusting units 3 having different vertical dimensions. The height adjusting units 3 are formed on the top surface 11e of the computer body 11 and extend upward therefrom to thereby form free upper ends engageable with a bottom face of the carrier board 14 of the keyboard device 10. Similar to the height adjusting units 2 of the embodiment illustrated in FIG. 4, the height adjusting units 3 of the embodiment illustrated in FIG. 5 are of different selected vertical dimensions so that when the keyboard device 10 is mounted to the top surface 11e of the computer body 11, the upper free ends of the height adjusting units 3 are set in engagement with the bottom face of the carrier board 14 of the keyboard device 10 so as to substantially maintain the keyboard device 10 substantially on a horizontal plane. Again, the vertical dimensions of the height adjusting units 3 can be set to increase or decrease in accordance with the inclination angle or slope θ of the top surface 11e so that when the upper ends of the height adjusting units 3 engage and support the bottom face of the carrier board 14 of the keyboard device 10, the keyboard device 10 is put in a horizontal condition.

Figure 6:
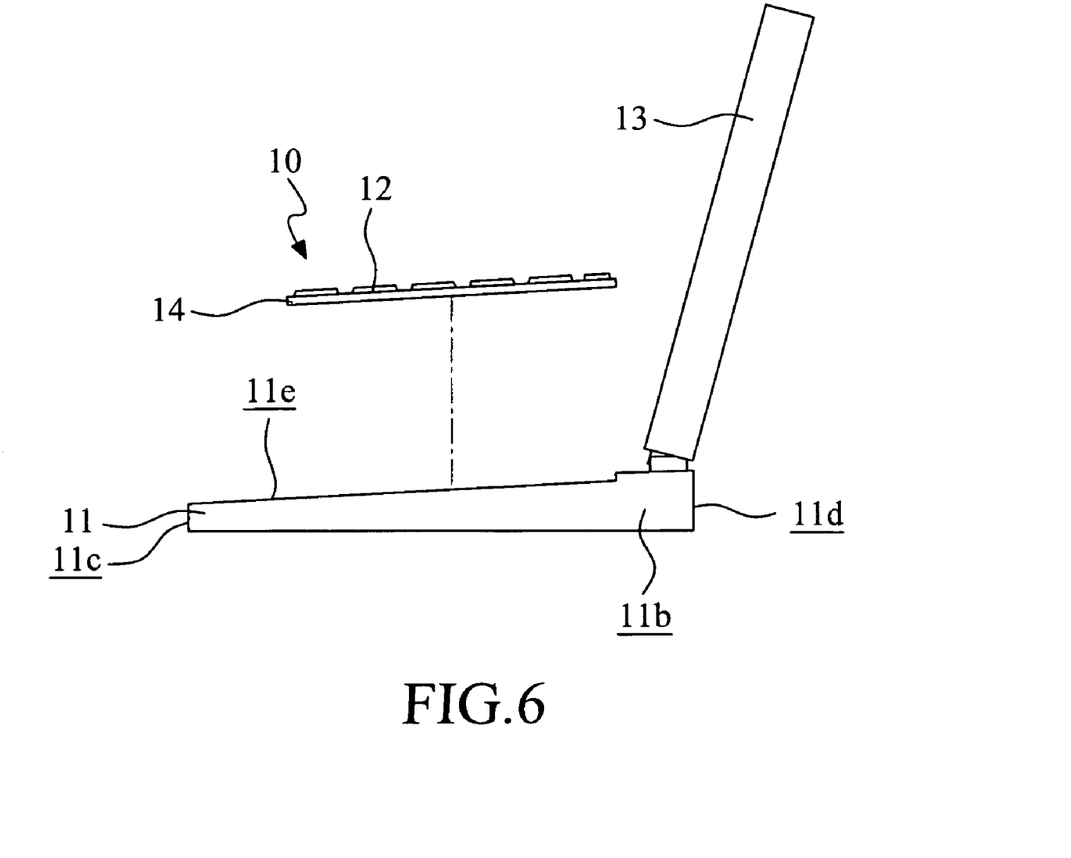
FIG. 6 shows a side elevation, in an exploded form, of a portable electronic device constructed in accordance with another embodiment of the present invention.

FIG. 6 shows another embodiment, wherein the top surface 11e of the computer body 10 is set in a sloped condition with respect to a reference horizontal surface so that the top surface 11e of the computer body 11 is inclined downward from the rear wall 11d to the front wall 11c. Again, the inclination of the top surface 11e of the computer body 11 guides any water spilled on the top surface 11e away from the computer body 11 by the gravity of the water. The keyboard device 10 is mounted to the top surface 11e of the computer body 11 and is thus set inclined so that water spilled on the keyboard device 10 can be guided away. Similar to the embodiments illustrated in FIGS. 4 and 5, if desired, height adjusting units can be arranged between the keyboard device 10 and the top surface 11e of the computer body 11 to selectively set the keyboard device 10 in a horizontal condition.

Figure 7:
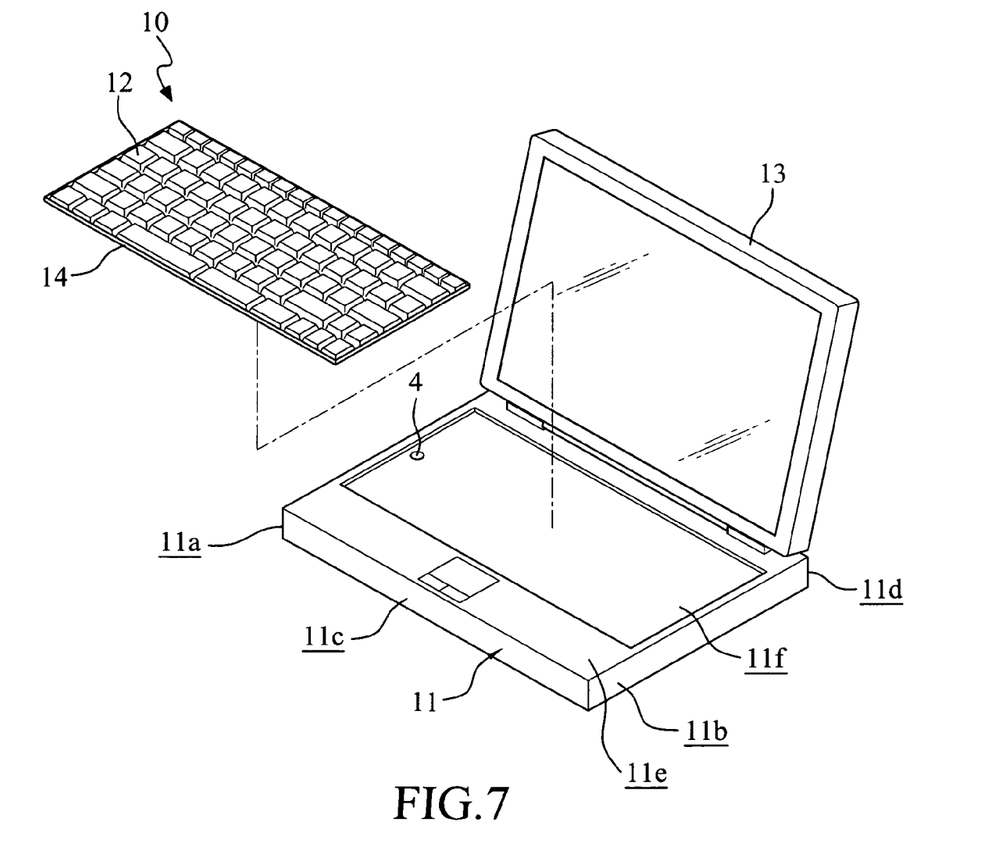
FIG. 7 shows an exploded view of a portable electronic device constructed in accordance with a further embodiment of the present invention.

The present invention is also made to selectively include one or more drain holes to facilitate drainage of water out of the computer. An embodiment of the present invention that include a drain hole is illustrated in FIG. 7, wherein the top surface 11e of the computer body 11 is provided with a drain hole, designated at 4, for draining water. In the embodiment illustrated in FIG. 7, the drain hole 4 is formed in the keyboard receptacle zone 11f and extends downward and completely through the computer body 11 in the vertical direction. Thus, when water spilled onto the keyboard device 10 or the top surface 11e of the body 11, the water can be guided to the lower bottom of the computer body 11 through the drain hole 4 so that the water will not be kept in the computer.

The drain hole 4 can be located at any desired position on the top surface 11e of the computer body 11 and is preferably set at a location close to or adjacent either the front wall, the rear wall, the left side wall or the right side wall.

Figure 8:
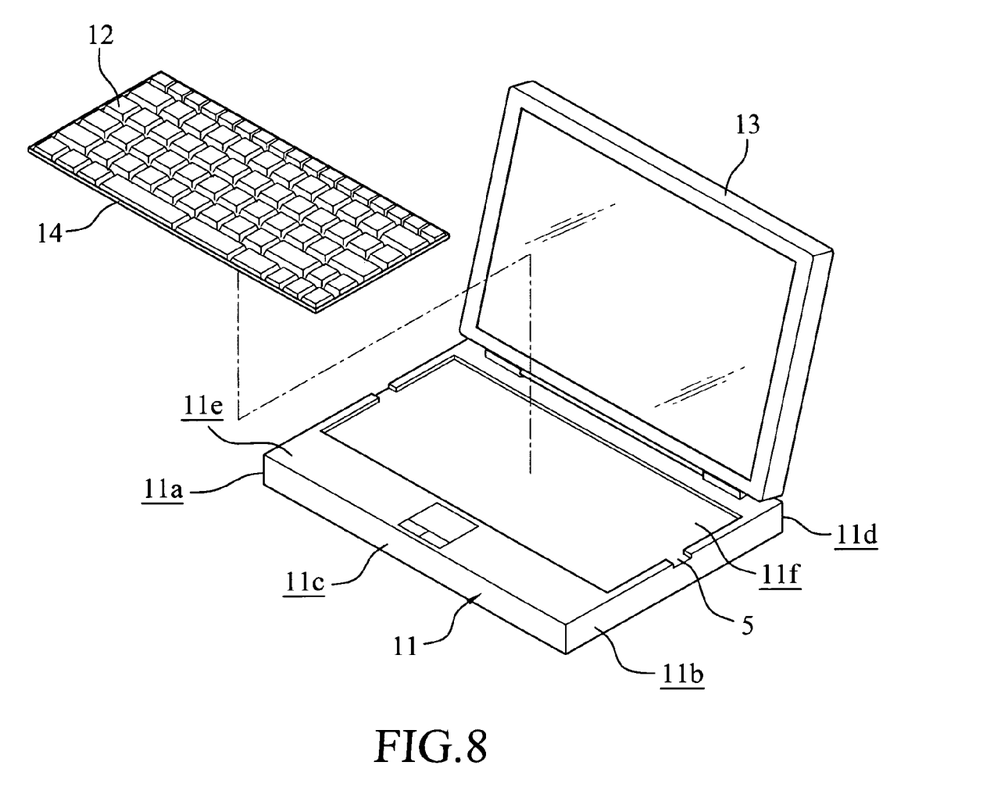
FIG. 8 shows an exploded view of a portable electronic device constructed in accordance with a further embodiment of the present invention.

Alternatively, the drain hole can be replaced by a groove. As shown in FIG. 8, the keyboard receptacle zone 11f, which is formed by a recess in the top surface 11e of the computer body 11, is delimited by at least opposite left and right raised barriers, which may block the drainage of water that is spilled into the keyboard receptacle zone 11f. In accordance with the present invention, at least one of the barriers is provided with a groove 5 that extends through the barrier and communicates between the keyboard receptacle zone 11f and outside the computer body 11. Thus, water left in the keyboard receptacle zone 11f can be guided out of the keyboard receptacle zone 11f.

Figure 9:
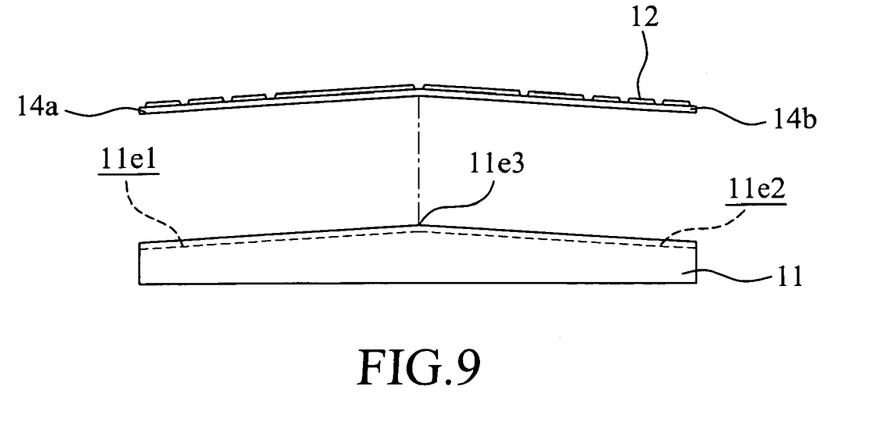
FIG. 9 is an elevation, in an exploded form, of the device body of a portable electronic device in accordance with a further embodiment of the present invention.
Figure 10:
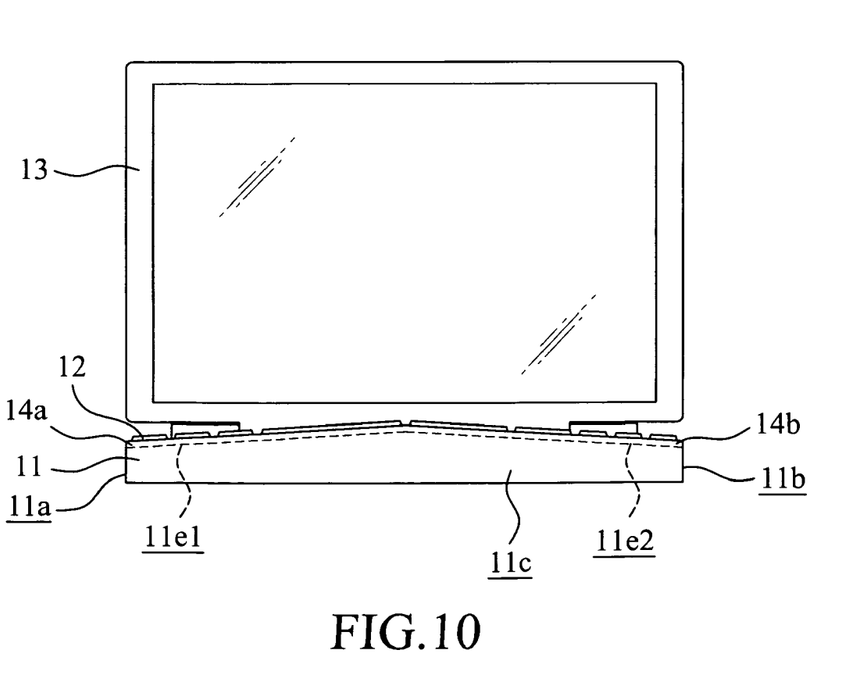
FIG. 10 is an elevation of the portable electronic device shown in FIG. 9.

A further embodiment of the drainage structure in accordance with the present invention is illustrated in FIGS. 9 and 10, wherein the top surface 11e of the computer body 11 forms a ridge 11e3 and a plurality of inclined sections 11e1, 11e2 extends from the ridge 11e3 toward the walls 11a-11d of the computer body 11. In the embodiment illustrated in FIGS. 9 and 10, the top surface 11e of the body 11 is composed of two inclined sections 11e1, 11e2 on opposite sides of the ridge 11e3 and extending from the ridge 11e3 toward the left side wall 11a and the right side wall 11b respectively. Thus, an angle, such as an obtuse angle, is formed between the inclined sections 11e1, 11e2. Corresponding to the two inclined sections 11e1, 11e2 of the top surface 11e of the computer body 11, the keyboard device 10 comprises a carrier board that is composed of two inclined segments 14a, 14b having substantially the same inclination as the inclined sections 11e1, 11e2 of the top surface 11e and jointed at an apex corresponding to the ridge 11e3 of the top surface 11e. Thus, the carrier board of the keyboard device 10 can be properly and snugly positioned on the top surface 11e of the computer body 11. It is noted that the inclined sections 11e1, 11e2 can be formed in the keyboard receptacle zone 11f so that when the keyboard device 10 is received in the keyboard receptacle zone 11f, the keyboard device 10 can be stably and firmly supported by the inclined sections 11e1, 11e2.

Again, the two inclined sections 11e1, 11e2 of the top surface 11e of the computer body 11 helps draining any water spilled onto the top surface 11e of the computer body 11 or the keyboard device 10 by allowing the water to flow down the inclination by the gravity of the water.

Figure 11:
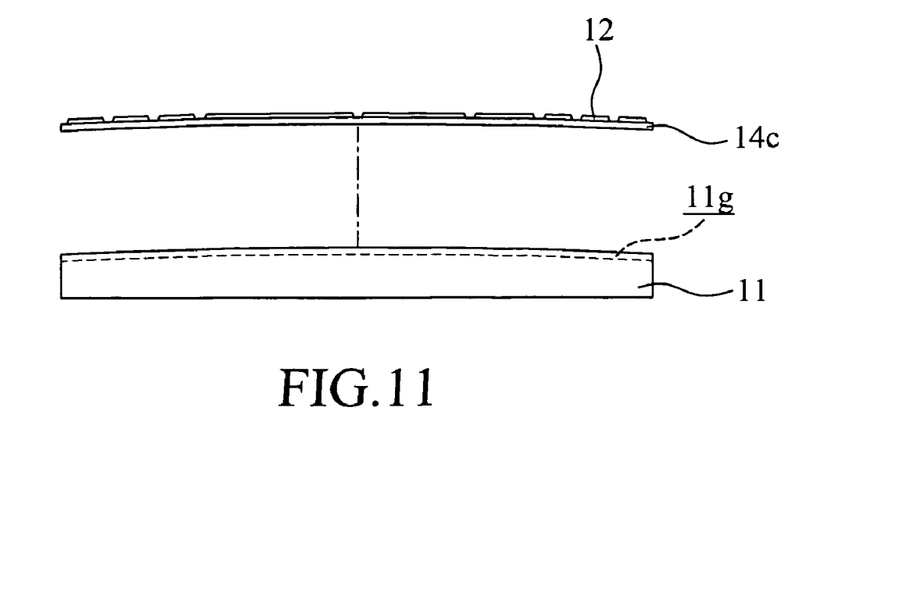
FIG. 11 is an elevation, in an exploded form, of the device body of a portable electronic device in accordance with yet a further embodiment of the present invention.
Figure 12:
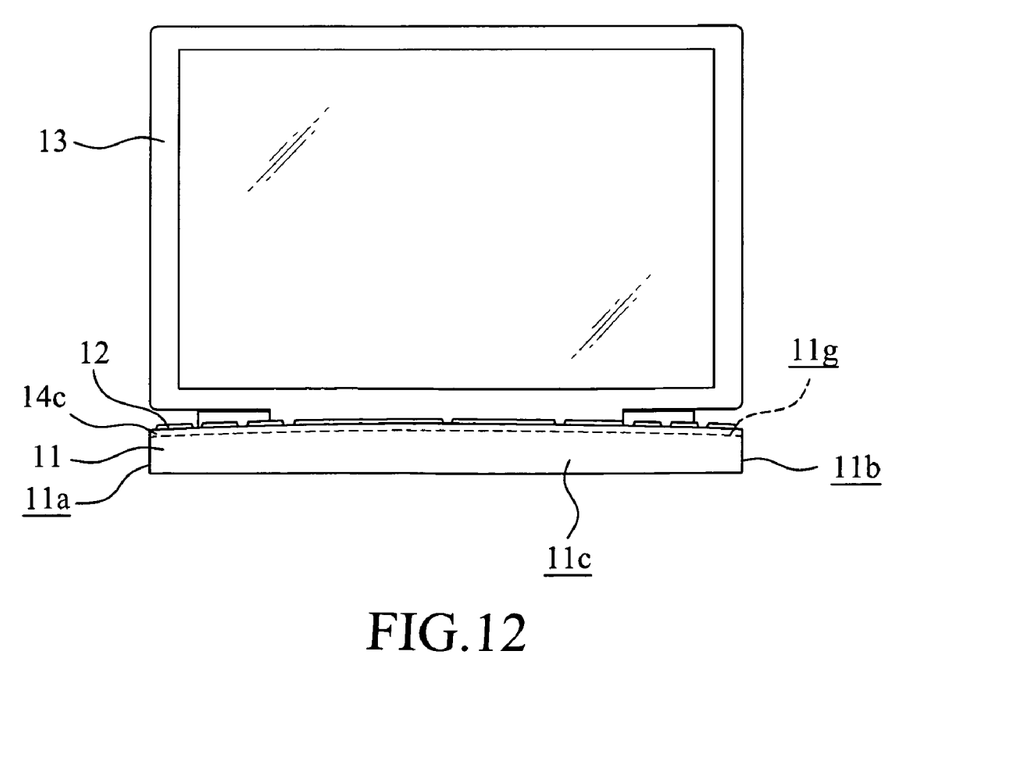
FIG. 12 is an elevation of the portable electronic device shown in FIG. 10.

As a modification of the embodiment illustrated in FIGS. 9 and 10, the angled ridge of the 11e3 of the top surface of computer body illustrated in the previous embodiment of FIGS. 9 and 10 is replaced by a curved section that joints between the two inclined sections or the top surface is simply replaced by a curved surface that is convex upward with a raised central section and two downward inclined side sections extending to the left and right side walls 11a, 11b. This is illustrated in FIGS. 11 and 12, wherein the top surface of the computer body 11 is formed as a curved surface 11g and the keyboard device 10 has key units 12 arranged on a carrier board 14c that is curved to correspond to the curved surface 11g of the computer body 11, so that the keyboard device 10 can be properly set on the curved top surface 11g of the computer body 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A portable electronic device, comprising:
   a body having a top surface, a front wall, a rear wall opposite to the front wall, a left side wall, and a right side wall opposite to the left side wall;
   at least one drainage structure, which is formed at a predetermined location on the top surface of the body, and the top surface of the body comprising a first inclined section having a first water-guiding inclination angle with respect to a reference horizontal surface and extending in a direction toward the drainage structure;

a keyboard device comprising a carrier board and a plurality of key units arranged on a top face of the carrier board, wherein the carrier board is mounted to the top surface of the body; and at least one height adjusting unit arranged at a predetermined location between the body and the keyboard device so that when the keyboard device is mounted to the top surface of the body, a surface of the keyboard device is maintained substantially on the horizontal reference surface.

2. The portable electronic device as claimed in claim 1, wherein the drainage structure comprises at least one drainage hole formed in the body.

3. The portable electronic device as claimed in claim 1, wherein the drainage structure comprises at least one drainage groove formed in the body.

4. The portable electronic device as claimed in claim 1, wherein the drainage structure is formed at the predetermined location that is close to one of the right side wall, the left side wall, the front wall, and the rear wall of the body.

5. The portable electronic device as claimed in claim 1 wherein the top surface of the body forms a keyboard receptacle zone and wherein the keyboard device is received in the keyboard receptacle zone.

6. The portable electronic device as claimed in claim 1, wherein the height adjustment unit is provided on the top surface of the body for engaging a corresponding location on a bottom face of the carrier board of the keyboard device.

7. The portable electronic device as claimed in claim 1, wherein the height adjustment unit is provided on a bottom face of the carrier board of the keyboard device of the body for engaging a corresponding location on the top surface.

8. The portable electronic device as claimed in claim 1, wherein the top surface further comprises a second inclined section having a second water-guiding inclination angle with respect to the reference horizontal surface, wherein the first inclined section and the second inclined section are joined at a ridge which comprises an apex of the top surface.

9. The portable electronic device as claimed in claim 1 wherein the top surface further comprises a second inclined section having a second water-guiding inclination angle with respect to the reference horizontal surface, wherein the first inclined section and the second inclined section are each curved and joined at a raised portion which comprises an apex of the top surface.

* * * * *